(12) United States Patent
Gazaui

(10) Patent No.: US 7,377,566 B2
(45) Date of Patent: May 27, 2008

(54) HAND SHIELD

(76) Inventor: Bryan Theodore Gazaui, 2899 Agoura Rd., #143, Westlake Village, CA (US) 91361

( * ) Notice: Subject to any disclaimer, the term of this patent is extended or adjusted under 35 U.S.C. 154(b) by 223 days.

(21) Appl. No.: 11/004,483

(22) Filed: Dec. 3, 2004

(65) Prior Publication Data

US 2005/0121927 A1    Jun. 9, 2005

Related U.S. Application Data

(60) Provisional application No. 60/527,736, filed on Dec. 8, 2003.

(51) Int. Cl.
B65G 7/12 (2006.01)
(52) U.S. Cl. .................. 294/25; 294/137; 294/142
(58) Field of Classification Search .................. 294/25, 294/137, 142, 171; D9/434, 455; 2/16, 2/20, 21
See application file for complete search history.

(56) References Cited

U.S. PATENT DOCUMENTS

| | | | |
|---|---|---|---|
| 1,008,604 A * | 11/1911 | Lake | 16/411 |
| 2,287,329 A * | 6/1942 | Santa Maria et al. | 294/171 |
| D157,859 S | 3/1950 | Glukes | |
| 3,083,366 A * | 3/1963 | Franges | 294/171 |
| 3,226,147 A | 12/1965 | Marshall | |
| 3,554,418 A * | 1/1971 | Holmes | 294/142 |
| 3,799,416 A | 3/1974 | Schmalz | |
| 4,045,067 A | 8/1977 | Wieder | |
| D277,721 S * | 2/1985 | Jordan | D6/328 |
| D291,405 S | 8/1987 | Finesman et al. | |
| 4,824,156 A | 4/1989 | Greene | |
| 5,180,165 A * | 1/1993 | Frost | 473/206 |
| 5,306,063 A | 4/1994 | Higgins et al. | |
| D356,261 S | 3/1995 | Miceli, Jr. | |
| D358,094 S | 5/1995 | DeGiacomo, Jr. | |
| D361,263 S | 8/1995 | Carmo et al. | |
| D362,621 S | 9/1995 | Blocker | |
| D363,664 S * | 10/1995 | Muchnick | D9/434 |
| D364,806 S | 12/1995 | Cole | |
| D369,746 S * | 5/1996 | Sheppard | D9/434 |
| 5,524,948 A | 6/1996 | Bostwick | |
| 5,527,076 A * | 6/1996 | Randels | 294/25 |
| D380,670 S | 7/1997 | Blocker | |
| 5,770,297 A * | 6/1998 | Grubich | 428/99 |
| 6,003,918 A | 12/1999 | Hulyk | |
| 6,341,376 B1 | 1/2002 | Smerdon, Jr. | |

* cited by examiner

Primary Examiner—Dean J Kramer
(74) Attorney, Agent, or Firm—Mark E. Hankin; Hankin Patent Law, APC

(57) ABSTRACT

A hand shield is provided comprising a body dimensioned to cover the first web space of a human hand, a proximal end extending from the body in the direction of the thumb, and a distal end extending from the body in the direction of the index finger. The body may have a variety of shapes and profiles, and comprises a base resting over the first web side of the hand, an anterior wall covering at least a portion of the anterior side of the hand, and a posterior wall covering at least a portion of the posterior side of the hand.

10 Claims, 5 Drawing Sheets

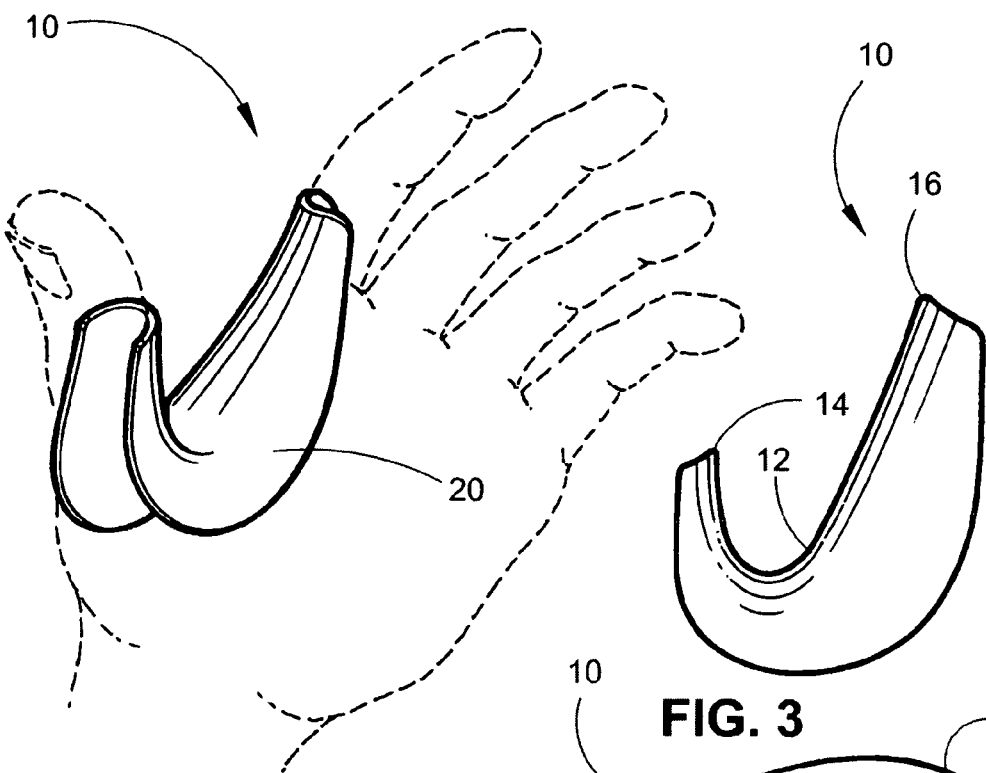
FIG. 1
FIG. 3
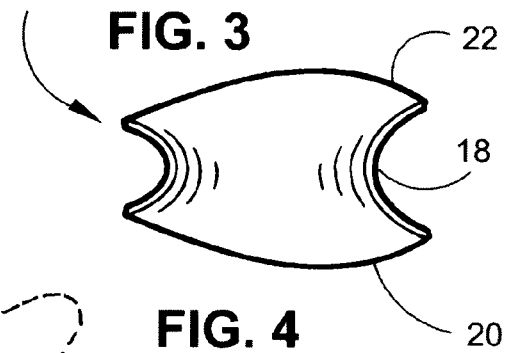
FIG. 4
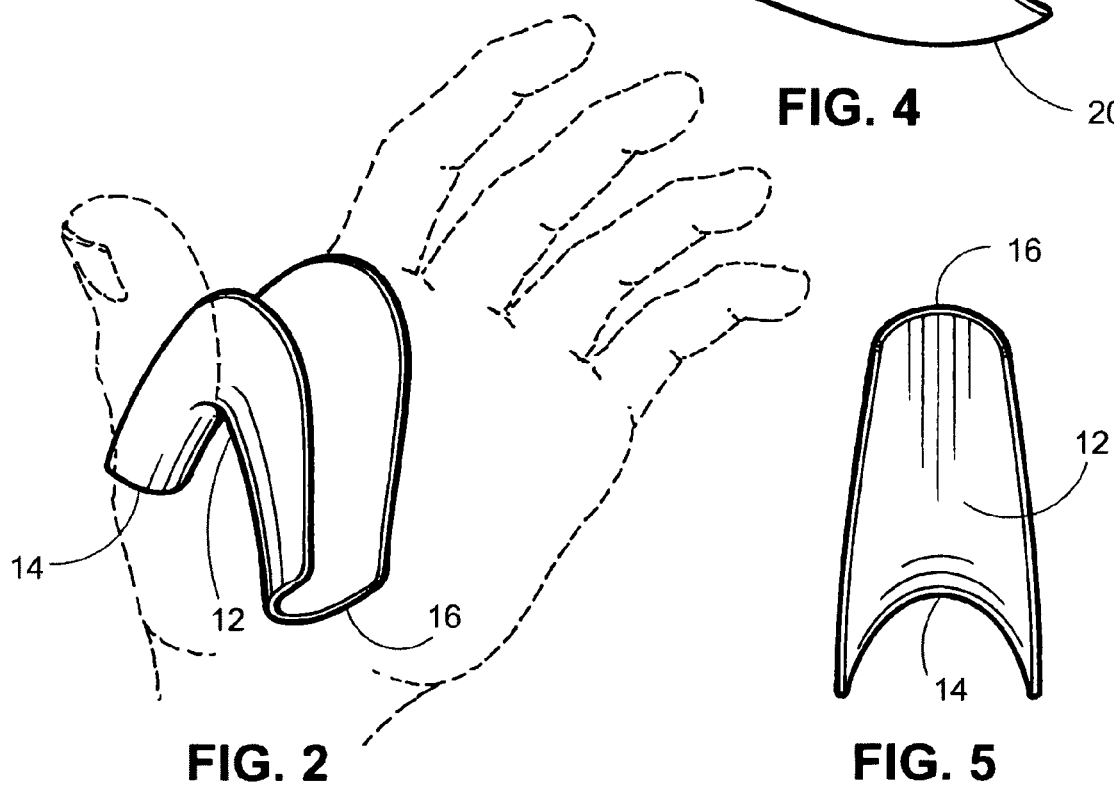
FIG. 2
FIG. 5

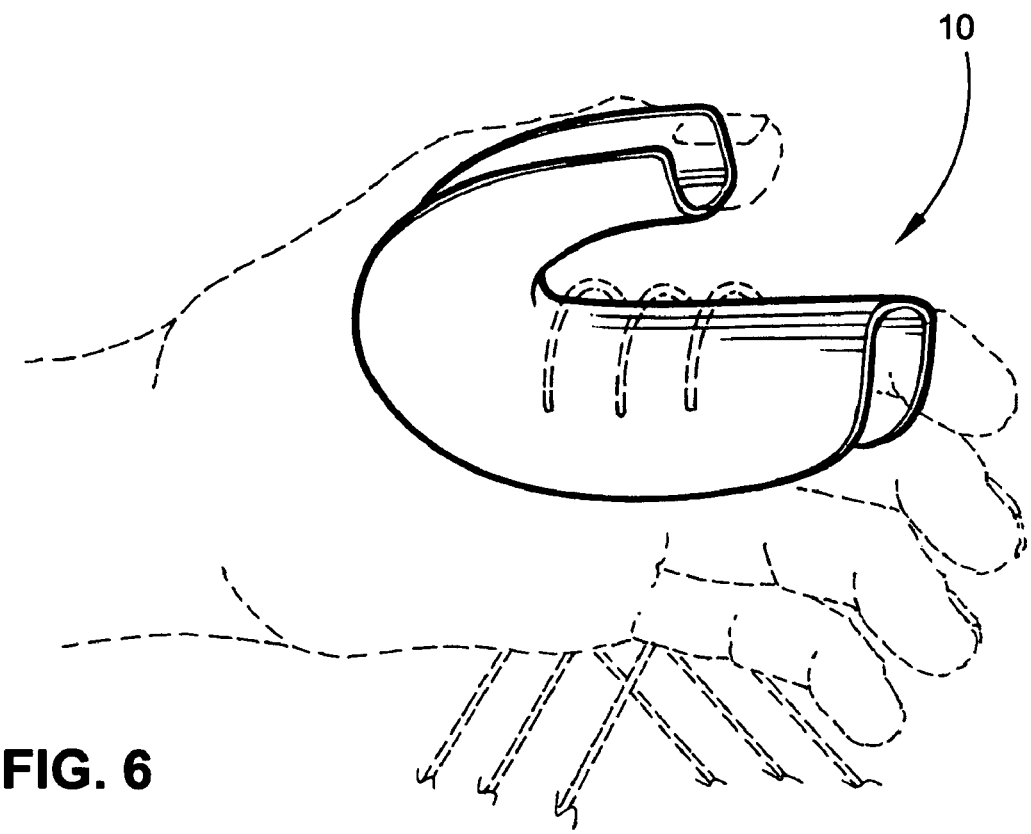
FIG. 6
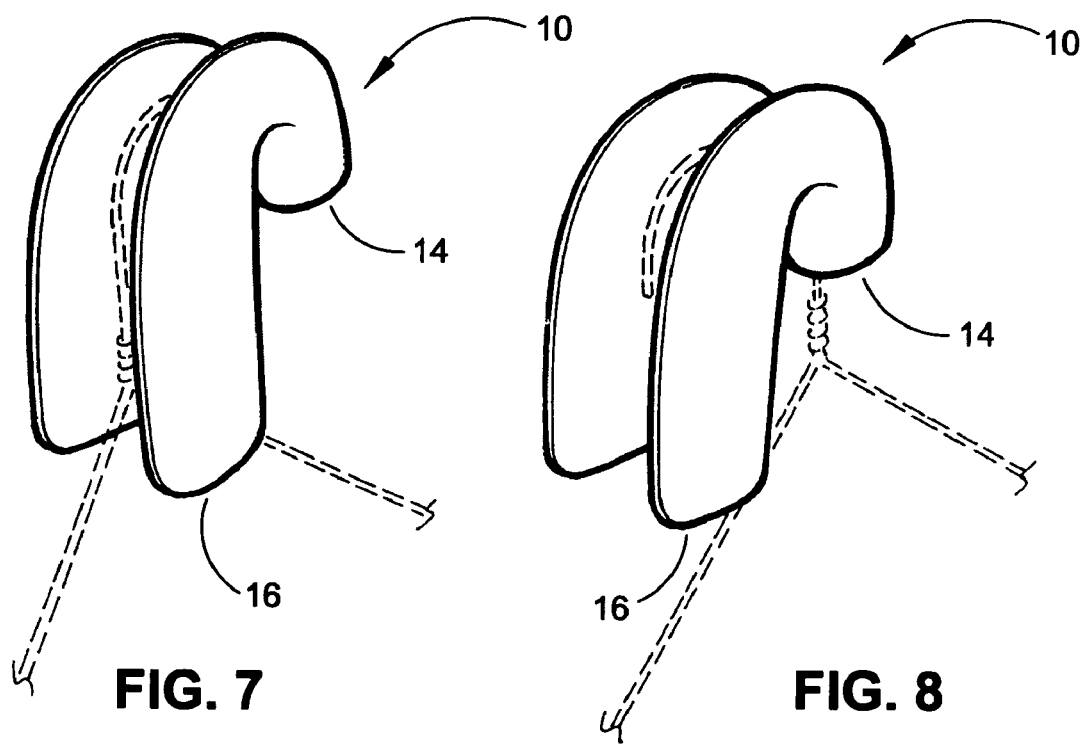
FIG. 7   FIG. 8

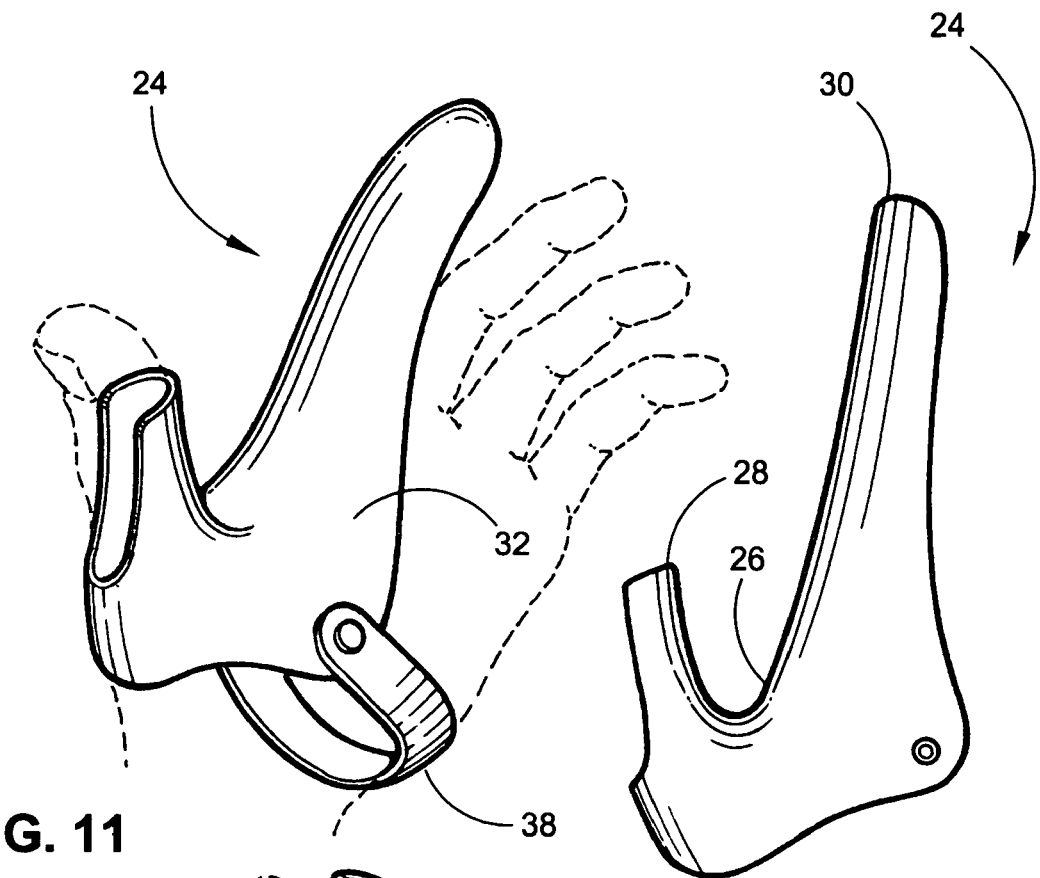
FIG. 11
FIG. 13
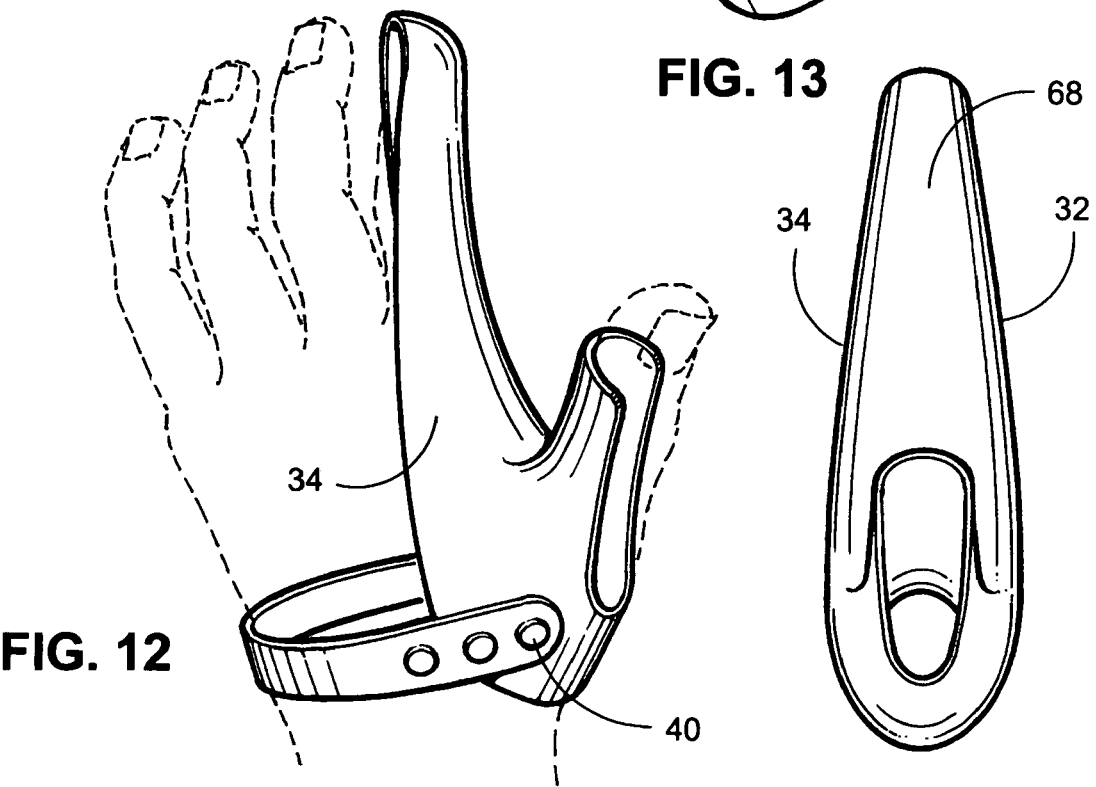
FIG. 12
FIG. 14

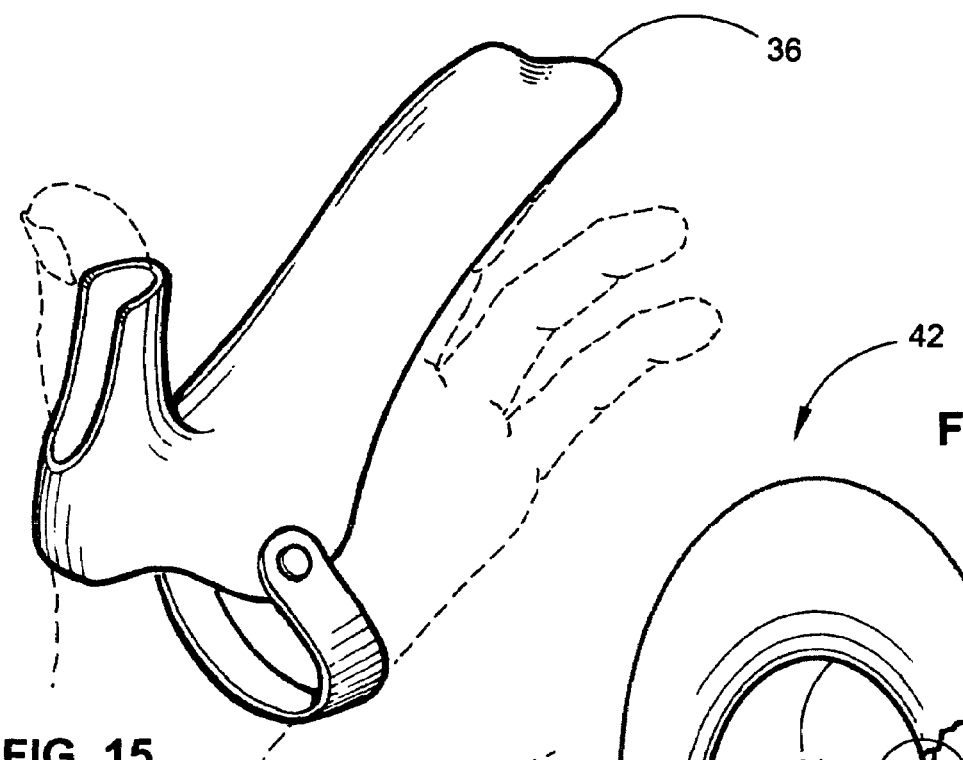
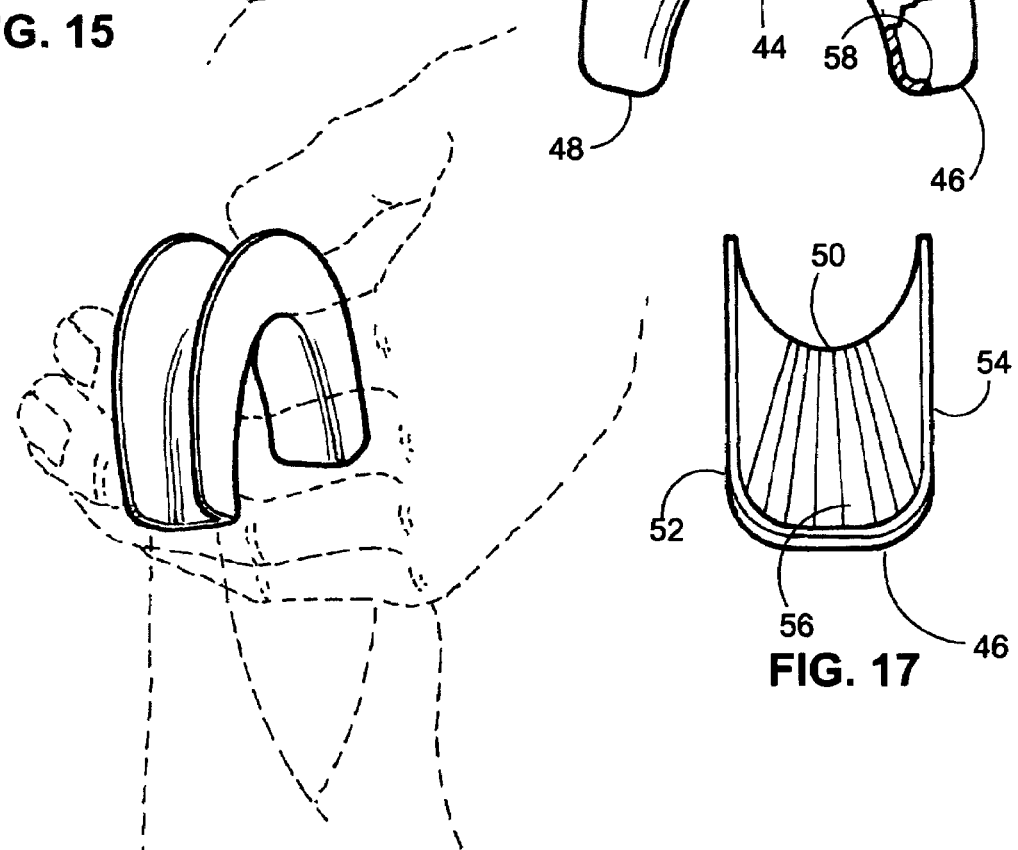

HAND SHIELD

CROSS REFERENCE TO RELATED APPLICATIONS

This patent application claims priority to Provisional Patent Application Ser. No. 60/527,736 filed on Dec. 8, 2003 by Applicant Bryan Theodore Gazaui and titled "Hand Shield."

STATEMENT REGARDING FEDERALLY SPONSORED RESEARCH AND DEVELOPMENT

Not Applicable.

REFERENCE TO A COMPUTER LISTING, A TABLE, OR A COMPUTER PROGRAM LISTING COMPACT DISK APPENDIX

Not Applicable.

BACKGROUND OF THE INVENTION

1. Field of the Invention

This invention relates generally to the field of protective devices for human hands and, more specifically, to a shield protecting a human hand against certain types of compressive and shear forces.

2. Description of Related Art

A human hand requires protection against compressive and shear forces generated by narrow objects in a variety of professional and leisure environments. To mention just a few examples, in the dry-cleaning industry, operators carry multiple clothes hangers with hooks resting across the first web spaces of their hands or across their fingers while they move garments from one workstation to another, or during delivery of the garments. In the retail industry, store clerks carry multiple clothes hangers with hooks resting across the first web spaces of their hands or across their fingers when they move garments between racks, to and from dressing rooms, or to and from warehouses. The customers of dry cleaning or retail establishments also carry garments to their cars by holding the hooks of the clothes hangers across the first web spaces of their hands or against their fingers, or carry shopping bags with the straps resting across their fingers. In the construction industry, workers pull or slide objects such as ropes across the first web spaces of their hands.

A number of injuries derive from failing to protect the hand from the compressive and shear forces generated by narrow objects. These injuries range from strain on the skin and on the underlying muscles of the hand to more serious illnesses such as carpal tunnel, trigger thumb and finger, soft tissue injuries of the intrinsic muscles, injuries to the digital nerves, various types of skin damage, various types of wrists injuries, and arthritis.

Similarly, mechanical objects often require protection from the mechanical and shear forces generated by narrow objects in a static or dynamic environment. For instance, grab bars in the passenger compartment of a vehicle need protection against the wear and tear caused by hooks of clothes hangers attached to such grab bars.

Therefore, there is a need for an appropriately designed hand shield to protect the users from the above injuries. At the same time, there is a need for a product that may be employed not only as a hand shield, but also for shielding objects other than a human hand, for instance, for protecting mechanical parts from damage.

BRIEF SUMMARY OF THE INVENTION

A hand shield is provided comprising a body dimensioned to cover the first web space of a human hand, a proximal end extending from the body in the direction of the thumb, and a distal end extending from the body in the direction of the index finger. The body may have a variety of shapes and profiles, and comprises a base resting over the first web side of the hand, an anterior wall covering at least a portion of the anterior side of the hand, and a posterior wall covering at least a portion of the posterior side of the hand.

It is an advantage of the present invention to protect a human hand against compressive and shear forces generated by narrow objects.

It is another advantage of the present invention to protect a human hand against injuries such as skin damage, carpal tunnel, trigger thumb and finger, soft tissue injuries of the intrinsic muscles of the hand, and injuries to the digital nerves.

It is a further advantage of the present invention to provide comfort to a user carrying or moving objects on the first web space or on the fingers of her hand, for instance, clothes hanger hooks, shopping bags, and ropes.

It is yet another advantage of the present invention to prevent damages to surfaces or components other than a human hand, for instance, grab handles in cars to which clothes hanger hooks are attached.

It is still another advantage of the present invention to enable the user to gather narrow objects, such as hooks of clothes hangers, within a narrow space.

These and other advantages of the present invention will become apparent from a reading of the following description, and may be realized by means of the instrumentalities and combinations particularly pointed out in the appended claims.

BRIEF DESCRIPTION OF THE SEVERAL VIEWS OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 1 is a perspective view of a first embodiment of the invention when applied lengthwise over the first web space of a human hand.

FIG. 2 is a perspective view of the embodiment of FIG. 1 when applied cross-wise and upside-down over the first web of a human hand.

FIG. 3 is a side view of the embodiment of FIG. 1.

FIG. 4 is a plan view of the embodiment of FIG. 1.

FIG. 5 is an elevational view of the embodiment of FIG. 1, wherein the cross-section of the proximal end is wider than the cross-section of the distal end.

FIG. 6 is a perspective view of the embodiment of FIG. 1, shown protecting a first web space from clothes hanger hooks.

FIG. 7 illustrates a first mode of fitting a clothes hanger hook on the embodiment of FIG. 1.

FIG. 8 illustrates a second mode of fitting a clothes hanger hook on the embodiment of FIG. 1.

FIG. 11 is a perspective view of a second embodiment of the invention, as seen from the anterior side of a human hand.

FIG. 12 is a perspective view of the embodiment of FIG. 11, as seen from the posterior side of a human hand.

FIG. 13 is a side view of the embodiment of FIG. 11.

FIG. 14 is a plan view of the embodiment of FIG. 11.

FIG. 15 illustrates a variation of the embodiment of FIGS. 11-12, wherein the distal end of the hand shield covers more than one finger.

FIG. 16 is a side view of a third embodiment of the invention.

FIG. 17 is a front view of the embodiment of FIG. 16.

FIG. 18 is a perspective view of the embodiment of FIG. 16, as used across the fingers of a human hand.

DETAILED DESCRIPTION OF THE INVENTION

Figure 9:
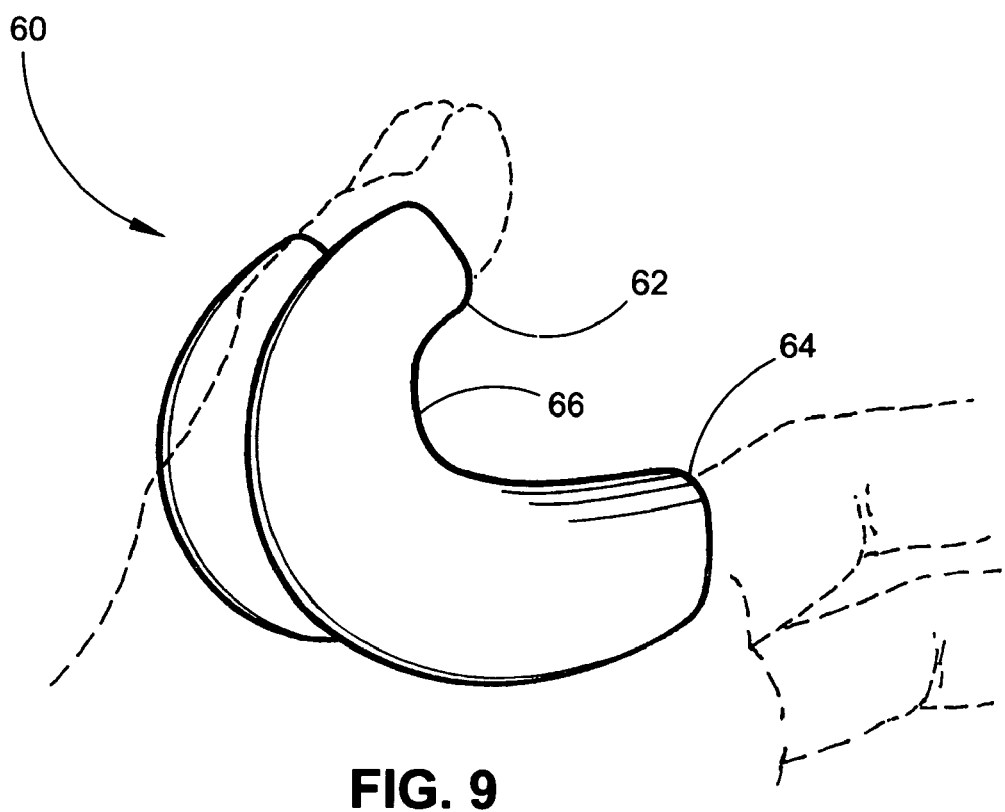
FIG. 9 is a first perspective view illustrating the first embodiment of the invention with a truncated shape.

Detailed descriptions of embodiments of the invention are disclosed herein. It should be understood, however, that the disclosed embodiments are merely exemplary of the invention, which may be embodied in various forms. Therefore, the details disclosed herein are not to be interpreted as limiting, but merely as the basis for the claims and for teaching one skilled in the art how to make and use the invention.

Turning now to FIGS. 1, 3, and 4, there is shown a first embodiment of the invention. A hand shield 10 has a shape reminiscent of a saddle and comprises a body 12, which is dimensioned to cover the first web space of a human hand, a proximal end 14 extending in the direction of the thumb, and a distal end 16 extending in the direction of the index finger. Body 12 is preferably shaped with an arched contour, which conforms to the first web space of the hand and which connects proximal end 14 to distal end 16. Further, the cross-section of body 12 is U-shaped, and comprises a base 18, which has preferably a rounded profile to wrap across to the first web space of the hand, an anterior wall 20, which extends from base 18 to cover at least a portion of the anterior side of the hand, and a posterior wall 22, which extends from base 18 to cover at least a portion of the posterior side of the hand. Anterior wall 20 and posterior wall 22 also extend to connect proximal end 14 to distal end 16.

When hand shield 10 is employed to protect a hand form the compressive and shear forces of clothes hanger hooks, base 18 has a preferably rounded profile lying across the first web space and having a radius of curvature of less than 5 cm, in order to fit the diameters of clothes hanger hooks. FIGS. 6-8 illustrate how hand shield 10 may be utilized and, more specifically, how a user may protect her hand from the stresses caused by clothes hanger hooks by utilizing hand shield 10. FIGS. 7-8 instead illustrate different ways of fitting clothes hanger hooks over hand shield 10 when hand shield 10 is positioned cross-wise over the user's fingers. Hand shield 10 may be employed likewise to protect a hand from the straps of shopping bags.

The outer edges of anterior wall 20 and posterior wall 22 may be shaped with different patterns. For instance, FIG. 4 illustrates hand shield 10 having anterior wall 20 and posterior wall 22 with rounded edges; however, anterior wall 20 and posterior wall 22 may be shaped differently, either to comply with different applications of the hand shield, or to conform to different market tastes, or to display a customer logo, such as the name of a retail chain. Similarly, hand shield 10 may be imprinted with a variety of promotional messages.

Proximal end 14 may extend to different points of the thumb. For instance, proximal end 14 may extend to approximately the inter-phalangeal joint of the thumb, or to a point between the metacarpo-phalangeal joint and the inter-phalangeal joint of the thumb, or to the tip of the thumb. Further, the edge of proximal end 14 may be contoured with a variety of shapes, for instance, a rounded shape extending towards the outer end of the thumb, or a truncated shape.

Likewise, distal end 16 may extend to different points between the first web space and the tip of the index finger. For instance, distal end 16 may extend to approximately the metacarpo-phalangeal joint of the index finger, or to a point between the metacarpo-phalangeal joint and the tip of the index finger, or may even cover the tip of the index finger. Distal end 16 may also be contoured with a variety of shapes, for instance, a rounded shape extending towards the outer end of the index finger, a truncated shape ending before the metacarpo-phalangeal joint of the index finger, or a hood-like shape covering the tip of the index finger.

Further, body 12 may exhibit a cross-section of constant width between anterior wall 20 and posterior wall 22, or a cross-section of varying widths. For instance, body 12 may exhibit a convergent shape as shown in FIG. 5, wherein the cross-section at proximal end 14 is wider than the cross-section at distal end 16.

In different variations of hand shield 10, anterior wall 20 and posterior wall 22 may extend to partially wrap around the first metacarpal bone of the thumb, or may join to completely wrap the first metacarpal bone.

Turning now to FIG. 2, hand shield 10 may also be employed in an upside-down position, resting crosswise over the first web space, with distal end 16 extending generally (but not necessarily) over the anterior side of the hand and proximal end 14 extending generally (but not necessarily) over the posterior side of the hand. When this type of use is contemplated, the arched contour of body 12 connecting proximal end 14 to distal end 16 will preferably have a radius of curvature, along its lengthwise direction, of less than 5 cm, in order to enable the user to append clothes hanger hooks over hand shield 10 in a lengthwise direction.

Figure 10:
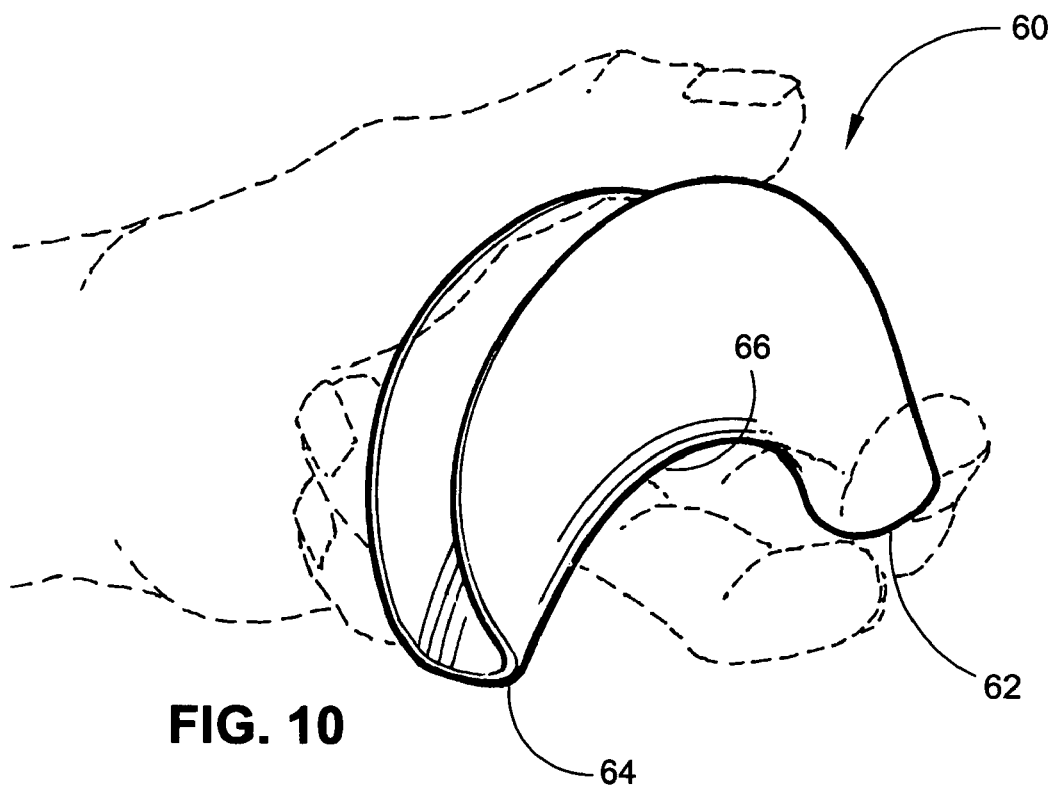
FIG. 10 is a second perspective view illustrating the first embodiment of the invention with a truncated shape.

FIGS. 9-10 show a hand shield 60 having both a truncated proximal end 62, and also a convergent shape, wherein the cross-section at proximal end 62 is wider than at distal end 64. Hand shield 60 may be employed lengthwise over the first web space, as shown in FIG. 9, or cross-wise over the first web space, or be carried with two fingers, as shown in FIG. 10. If hand shield 60 is employed to protect a human hand from clothes hanger hooks, base 66 will preferably have a radius of curvature of less than 5 cm cross-wise if hand shield 60 is worn lengthwise over the first web space, or of 5 cm lengthwise if hand shield 60 is worn cross-wise over the first web space or is carried with two fingers.

FIGS. 11-14 illustrate a second embodiment of the invention. As shown in FIG. 13, a hand shield 24 comprises a body 26 dimensioned to cover the first web space of a human hand, a proximal end 28 extending from body 26 in the direction of the thumb and wrapping around the metacarpal bone of the hand, and a distal end 30 extending from body 26 to cover the entirety of the index finger, including the tip. Body 26 has a U-shaped cross-section comprising a base 68 covering the first web space, an anterior wall 32 covering at least a portion of the anterior side of the hand, and a posterior wall 34 covering at least a portion of the posterior side of the hand. Base 68 has preferably a rounded profile to connect anterior wall 32 to posterior wall 34, to achieve an optimal fit with the first web space.

FIG. 15 illustrates a variation of the second embodiment, wherein a distal end 36 covers two fingers. In another variation, the distal end covers more than two fingers. In still another variation, anterior wall 32 and posterior wall 34 extend towards the posterior side of the thumb wrapping the first metacarpal bone partially but without joining. In yet another variation, a ridge protrudes from base 68 in the proximity of the tip of the index finger, so that objects resting on base 68, for instance, clothes hanger hooks or straps of shopping bags, are hindered from sliding towards the tip of the index finger and off the hand.

In order to retain hand shield 24 over the first web space in a secure position, the peripheral areas of anterior wall 32 and posterior wall 34 may be connected in a variety of ways. For instance, as shown in FIGS. 11-12, a strap 38 may connect the peripheral area of anterior wall 32 to the peripheral area of posterior wall 34, wrapping around the hand and causing hand shield 24 to remain in a stable position. Strap 38 can be of different designs, for instance it can run across the palm of the hand or around the wrist. Strap 38 can also be fastened in a variety of ways, for instance, by inserting a pin 40 protruding from the peripheral area of one wall into an opening in strap 38, or by employing a hook and loop fabric, or through a combination of strap and buckle, or strap 38 may be permanently attached to the peripheral areas both of anterior wall 32 and posterior wall 34. Further, strap 38 may be made of an elastic material that can stretch and contract, or of a non-extensible material.

FIGS. 16-18 illustrate a third embodiment of the invention. A hand shield 42 is shaped essentially like a "C" comprising a body 44, a proximal end 46, and a distal end 48. Hand shield 42 may rest over different parts of a human hand, for instance, across the index finger or across the first web space to carry items such as straps of shopping bags or hooks of clothes hangers, and may further be employed to protect a variety of mechanical objects, such as grab bars, over which hand shield 42 would be then positioned crosswise.

Body 44 is essentially shaped like an open channel defined by a base 50, an anterior wall 52, and a posterior wall 54. Base 50 connects proximal end 46 to distal end 48. Anterior wall 52 and posterior wall 54 may be of constant height, or may be higher in the central portion of hand shield 42 than at the end portions. When carrying clothes hanger hooks, higher walls in the central portion of hand shield 42 will facilitate the retention of the clothes hanger hooks while allowing the clothes hanger hooks, and the garments carried by the clothes hangers, to spread at one end of hand shield 42.

As shown in FIG. 17, hand shield 42 may exhibit one or more ridges protruding from the base between anterior wall 52 and posterior wall 54 and running parallel along at least a portion of the C-shape, thereby defining narrow channels within which narrow objects can be positioned, for instance clothes hanger hooks or straps of shopping bags. In one variation, hand shield 42 exhibits a radius of curvature along the C-shape in a lengthwise direction that is less than 5 cm, to conform to the typical diameter of clothes hanger hooks. Conversely, if hand shield 42 is employed for carrying shopping bags or for comparable applications, the radius of curvature of the C-shape in a lengthwise direction may be such to allow the user to insert at least two fingers within and across the C-shape.

Proximal end 46 and distal end 48 may have straight edges, or proximal end 46 may exhibit a hook shape 58, curling outwards to define hook shape 58, within which tips of clothes hanger hooks or of comparable objects would come to rest. Hook shape 58 offers enhanced protection against scratches caused by the tips of coat hanger hooks. For instance, when hand shield 42 is used to protect a grab bar in the passenger compartment of a car, hook shape 58 prevents scratching of the passenger compartment walls.

The present invention can be manufactured from a variety of materials, such as plastic materials (for instance, polyethylene and polypropylene), elastomeric materials, reinforced leather materials, or cartaceous materials of different densities.

While the invention has been described in connection with a number of embodiments, it is not intended to limit the scope of the invention to the particular forms set forth, but on the contrary, it is intended to cover such alternatives, modifications, and equivalents as may be included within the spirit and scope of the invention.

What is claimed is:

1. A hand shield adapted to protect the hand when carrying standard sized clothing hangers and the like comprising:
    a body dimensioned to cover the first web space of a hand, the body having a U-shaped cross-section and a substantially uniform wall-thickness, the body comprising:
    a base having an arched contour connecting a proximal end to a distal end, such that the arched contour has an outer radius of curvature substantially equal to an inner radius of curvature of a hook portion of standard sized clothing hangers, such that the arched contour outer radius of curvature arranges the proximal end, arched contour, and distal end to fit matingly with the hook portion,
    an anterior wall covering at least a portion of the anterior side of the hand, and
    a posterior wall covering at least a portion of the posterior side of the hand, wherein:
    the base has a rounded profile connecting the anterior and posterior walls, the rounded profile having an outer radius of curvature substantially equal to an inner radius of curvature of a hook portion of standard sized clothing hangers, such that the rounded profile outer radius of curvature arranges the anterior wall, rounded profile, and posterior wall to fit matingly with the hook portion;
    the proximal end extends from the body in the direction of the thumb;
    the distal end extends from the body in the direction of the index finger;
    the anterior wall and the posterior wall each also extend to connect the proximal end to the distal end; and
    the hand shield has a convergent shape defined by a wider cross-section at the proximal end and a narrower cross-section at the distal end.

2. The hand shield of claim 1, wherein the outer edges of the anterior wall and of the posterior wall have curved shapes.

3. The hand shield of claim 1, wherein the proximal end extends to approximately the inter-phalangeal joint of the thumb.

4. The hand shield of claim 1, wherein the proximal end extends to approximately the tip of the thumb.

5. The hand shield of claim 1, wherein the proximal end extends to a point between the metacarpo-phalangeal joint and the inter-phalangeal joint of the thumb, and wherein the proximal end as a truncated shape.

6. The hand shield of claim 1, wherein the distal end extends to approximately the metacarpo-phalangeal joint of the index finger.

7. The hand shield of claim 1, wherein the distal end extends to a point between the metacarpo-phalangeal joint and the tip of the index finger.

8. The hand shield of claim 1, wherein the distal end extends to cover the tip of the index finger.

9. The hand shield of claim 1, wherein the anterior wall and the posterior wall extend to partially wrap around the fist metacarpal bone of the thumb.

10. The hand shield of claim 1, wherein the anterior and posterior walls extend to join and wrap around the first metacarpal bone of the thumb.

* * * * *